(No Model.)

C. A. McCORMICK.
MACHINE FOR MAKING HILLS FOR TOBACCO AND OTHER PLANTS.

No. 327,004. Patented Sept. 29, 1885.

Attest:
D. W. Strickland
Wm. Drake.

Inventor
Charles A. McCormick,
By Jere S. Twiley Atty.

UNITED STATES PATENT OFFICE.

CHARLES A. McCORMICK, OF RIPLEY, OHIO.

MACHINE FOR MAKING HILLS FOR TOBACCO AND OTHER PLANTS.

SPECIFICATION forming part of Letters Patent No. 327,004, dated September 29, 1885.

Application filed June 26, 1885. (No model.)

*To all whom it may concern:*

Be it known that I, CHARLES A. McCORMICK, a citizen of the United States, residing at Ripley, in the county of Brown and State of Ohio, have invented certain new and useful Improvements in Machines for Making Hills for Tobacco and other Plants, of which the following is a specification.

My invention relates to machines for forming small mounds or hills of soil, into which tobacco or other plants are transplanted, and also in the same machine providing means for distributing the fertilizing material.

Heretofore the hills have been formed by using a common hand-hoe, and with it collecting a sufficient amount of soil as will answer the purpose intended. This method is objectionable in that it is laborious and expensive, besides a waste of time. These objections are obviated by the use of my machine, which will be fully understood from the description herein contained, and by reference to the accompanying drawings, forming part of my application, in which—

Figure 1:
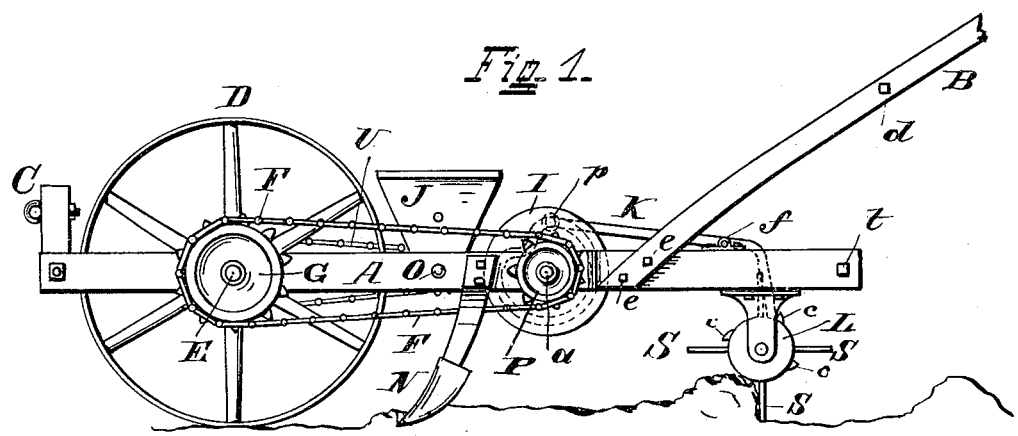
Figure 2:
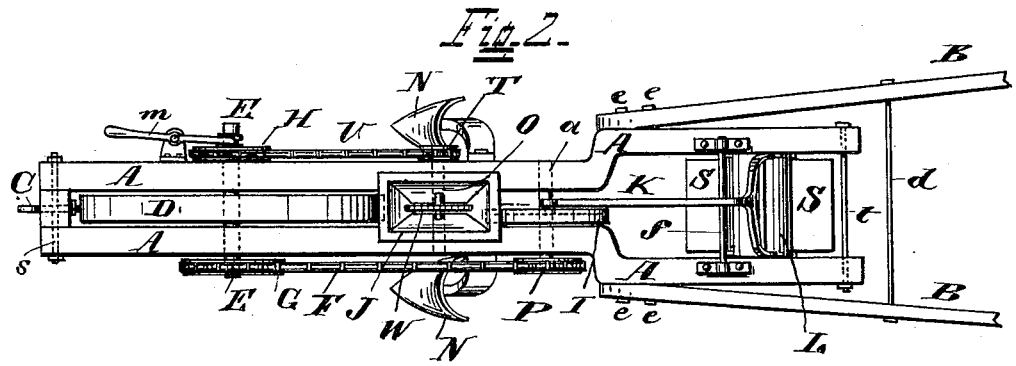
Figure 3:
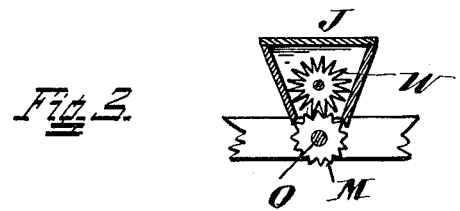
Figure 4:

Figure 1 is a side view of my machine. Fig. 2 is a plan or top view of same. Fig. 3 is a view, in section, of the fertilizer box or hopper, showing within it the crushing and feed wheel. Fig. 4 is a side view of the cam-wheel, through which is operated the soil-gatherer.

The letter A indicates the frame-work of the machine, which is strengthened by front and rear braces, s and t.

B B are the two handles, attached by bolts e e to the sides of the frame toward the rear, so that the operator can guide the machine in its movements.

C is the clevis at the forward end of the machine, at which point the draft is applied.

D is the main drive-wheel, and E the axle of the same.

d is the cross-brace, to strengthen and hold the handles B in position. The axle E extends out sufficiently on each side of the frame so as to receive and hold sprocket-wheels G and H.

I is a wheel having on its face a cam-groove, as seen more plainly in Fig. 4. This cam-wheel is mounted upon an axle, a, which carries on one end, as shown, the sprocket-wheel P, the other end being journaled and working in bearings in the frame A. The sprocket-wheels E and P carry and operate a chain, F. In the groove of the wheel I is a pin, p, at right angles to and integral with the arm K, whose rear end is forked and extends down to the periphery of the drum L, which carries the wings or scrapers S. This arm is slotted, and through the slot is passed a cross-piece, f, which is designed to act as a fulcrum and to limit the movement of the arm in its forward and backward throw. This drum L operates on an axle fastened between hangers on each side of the frame A, as shown. The forked ends of the arm K are in a line with projections or stop-teeth c, placed upon the periphery of the drum L, so that at every quarter-revolution of the drum it will be brought to a stand and held there until released by the elevation of the said forked ends of arm K. The pin p, which operates in the cam-slot of the wheel I, may be provided with a loose sleeve, in order that an unnecessary amount of friction may be avoided.

J is the hopper, properly supported, into which the fertilizing material is placed. In this hopper, properly journaled in bearings, is a feed-wheel, W, which also performs the office of crushing the fertilizing material, so that it will be evenly and regularly distributed. This feed-wheel is operated by a pinion, M, attached to an axle, O, one end of which operates in bearings in one side of the frame A, the other end receiving and holding the sprocket-wheel T, between which and the wheel H runs a suitable chain, U, communicating motion from one to the other.

When it is desired that no fertilizing material be sown, the wheel H can be moved out on the shaft E by means of the lever m, when it will be loose and not be affected by the operation of the axle E. Consequently no motion will be communicated to the chain U operating the wheel T, which operates the feeding mechanism.

N N are shovel-plows fastened to each side of the frame A. These plows loosen the soil and provide an amount of same as will enable the wings S to gather a quantity sufficient to supply the demand.

The operation of my machine is as folllows: The draft being applied, the machine is moved forward, causing the main wheel D to revolve. This causes the revolution of the sprocket-wheels G H, which in turn communicate motion by means of the chains U F to the wheels P T. The wheel P revolves the axle on which is mounted the cam-wheel I, and rotates the same, carrying with it and communicating to the arm K a reciprocating movement, and alternately raising and lowering its forked ends. While these ends are down they are in front of the teeth c and prevent the partial rotation of the drum. Consequently the wing or scraper S is carried along, as shown in Fig. 1, collecting in its march as much soil as may be until the cam-wheel raises the ends of the arm K. The moment this takes place no obstruction is offered to the drum, and it is revolved until the arm falls again with one of the projections c resting against it, and preventing further rotation. The succeeding wing will then be in a vertical position and ready to do its work. In the partial revolution of the drum its periphery will roll over and press slightly upon the collected soil, thus partially tamping and settling it, so that it will be firm and in good condition for the reception of the plants. Thus the operation is continued till all the hills are made.

The distances at which these hills are formed can be regulated by the number of teeth supplied to the sprocket-wheel P. I thus provide a machine which is simple in construction, performs its work rapidly and well, and saves expense and labor.

Having thus described my invention, what I claim, and desire to secure by Letters Patent, is—

1. In a machine for forming hills, a main wheel whose axle carries also on one end a sprocket or other wheel capable of communicating motion through a chain or belt to a similar wheel actuating a cam, in combination with a reciprocating lever working in said cam, whereby the same releases or holds a drum containing wings or scrapers which revolve with said drum, substantially as shown and described, and for the purpose specified.

2. A drum arranged between hangers attached to the frame, and provided with an axle on which it rotates, and wings or scrapers for gathering up the soil, together with stops or projections which impinge against a reciprocating shaft, so as to hold the drum at rest or allow it to be turned when the shaft is not in connection with them, substantially as shown and described, and for the purpose specified.

3. The combination, in a machine designed for forming hills for tobacco and other plants, of a cam-wheel operating an arm or shaft to engage or disengage with teeth on the periphery of a drum provided with scrapers, said shaft or arm being provided with a slot which acts as a fulcrum and limits its forward and backward throw, substantially as shown and described.

CHAS. A. McCORMICK.

Witnesses:
W. ELLWOOD WYNNE,
CHARLES LEHMER.